US008724026B2

(12) United States Patent
Macleod

(10) Patent No.: US 8,724,026 B2
(45) Date of Patent: May 13, 2014

(54) APPARATUS, METHOD AND ARTICLE FOR A DUAL-PROGRAM DISPLAY

(75) Inventor: Scott Macleod, Keighley (GB)

(73) Assignee: Eldon Technology Limited, Steeton (GB)

( * ) Notice: Subject to any disclaimer, the term of this patent is extended or adjusted under 35 U.S.C. 154(b) by 47 days.

(21) Appl. No.: 13/273,632

(22) Filed: Oct. 14, 2011

(65) Prior Publication Data

US 2013/0093956 A1   Apr. 18, 2013

(51) Int. Cl.
*H04N 5/445* (2011.01)

(52) U.S. Cl.
USPC ............... 348/564; 348/53; 348/58; 348/588

(58) Field of Classification Search
USPC ............ 348/588, 563–565, 569, 734, 53, 56, 348/52, 58, 77, 78, 584, 589; 345/6, 7, 8, 9
IPC ..................................................... H04N 5/445
See application file for complete search history.

(56) References Cited

U.S. PATENT DOCUMENTS

| 6,188,442 | B1 * | 2/2001 | Narayanaswami | 348/564 |
| 7,430,018 | B1 * | 9/2008 | Patel | 348/588 |
| 7,808,449 | B2 * | 10/2010 | Neidrich et al. | 345/6 |
| 8,310,527 | B2 * | 11/2012 | Ko et al. | 348/55 |
| 2011/0267439 | A1 * | 11/2011 | Chen et al. | 348/53 |
| 2012/0050507 | A1 * | 3/2012 | Keys | 348/56 |

* cited by examiner

*Primary Examiner* — Trang U Tran
(74) *Attorney, Agent, or Firm* — Seed IP Law Group PLLC

(57) ABSTRACT

A system for enabling two different users to independently view and listen to two completely different programs on the same display at the same time is provided. A user wears eyeglasses with filters to filter out light from the program which the user does not want to view, while allowing the light from the program the user does want to view to be seen by the user. Successive frames of a first program are displayed using light polarized in one direction in an alternating manner with frames of a second program using light polarized in another direction. A first user wears glasses with lenses configured to filter out the light from the second program while a second user wears glasses to filter out the light from the first program. Thus, while wearing the glasses, the first user can see the first program while watching the display, but not the second program. Simultaneously, while wearing the other glasses, the second user will see the second program, but not the first program.

21 Claims, 7 Drawing Sheets

APPARATUS, METHOD AND ARTICLE FOR A DUAL-PROGRAM DISPLAY

TECHNICAL FIELD

The present disclosure generally relates to displaying video or motion pictures, and more particularly to displaying video or motion pictures to multiple users.

BRIEF SUMMARY

In one example embodiment, the system enables two different users to independently view and listen to two completely different programs on the same display at the same time, using the entire or substantially the entire display for each of the two different programs. A user wears eyeglasses with filters to filter out light from the program which they do not want to view, while allowing the light from the program they do want to view to be seen by the user. Successive frames of a first program are displayed using light polarized in one direction in an alternating manner with frames of a second program using light polarized in another direction so that it appears, to the unaided human eye, that both programs are being displayed simultaneously in the same area on the same display. A first user wears glasses with lenses configured to filter out the light from the second program while a second user wears glasses to filter out the light from the first program. Thus, while wearing the glasses, the first user can see the first program while watching the display, but not the second program. Simultaneously, while wearing the other glasses, the second user will see the second program, but not the first program.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility and understanding of the features. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with polarized filters, generating images using polarized light, three dimensional (3D) television and film systems, passive polarized filtered glasses and passive and active liquid crystal glasses have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

Figure 1:
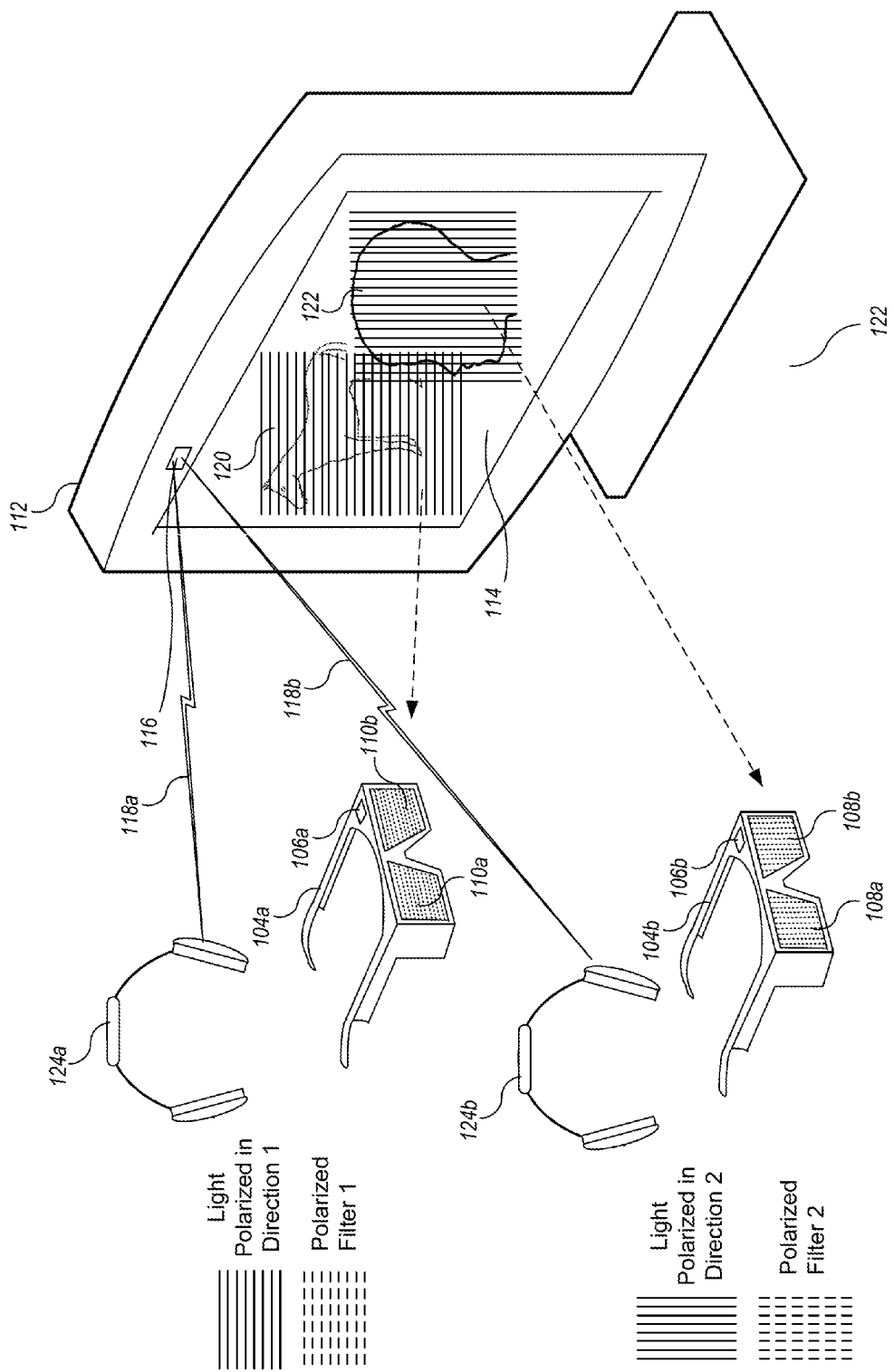
FIG. 1 is a diagram of a system for a dual-program display, according to one non-limiting illustrated embodiment.

FIG. 1 is a diagram of a system for a dual-program display according to one non-limiting illustrated embodiment. Systems, processes and techniques are provided to allow two different users to independently view and listen to two completely different programs on the same display 114 at the same time, using the entire or substantially the entire display 114 for each of two different programs 120, 122. A display 114 may include, but is not limited to: a television display, a monitor display, an interlaced video display, a non-interlaced video display, phase alternate line (PAL) display, National Television System Committee (NTSC) systems display, a progressive scan display, a plasma display, a liquid crystal display (LCD) display, a cathode ray tube (CRT) display and various High Definition (HD) displays, an IMAX™ screen, a movie screen, a projector screen, etc.

In one embodiment, a user wears eyeglasses (e.g., glasses 104a or glasses 104b) to filter out light from the program which they do not want to view, while allowing the light from the program they do want to view to be seen by the user. For example, presentation device 112 is displaying a first program 120 and a second program 122 simultaneously, or nearly simultaneously. In one example embodiment, this is performed by the presentation device 112 alternating the displaying of successive frames of program 120 with successive frames of program 122 each time the display 114 refreshes (shown in more detail in conjunction with FIG. 2 below) or at an even higher frequency in other types of displays. The successive frames of program 120 are displayed using light polarized in one direction, while the frames of program 122 are displayed using light polarized in another direction. Thus, when a first user wears glasses 104a (with filtered lenses 110a and 110b both configured to filter out program 122), the first user only sees the successive frames of program 120 and while a second user wears glasses 104b (with filtered lenses 108a and 108b both configured to filter out program 120), the second user only sees the successive frames of program 122.

The different programs 120 and 122 may be displayed using differently polarized light using various technologies available related to projecting or displaying two images that are otherwise traditionally used for generating a three dimensional (3D) effect using two stereoscopic images. For example, in a projector system, glasses 104a have a horizontally polarized filter in both lenses 110a and 110b and glasses 104b have a vertically polarized filter in both lenses 108a and 108b. A projector (not shown) of the presentation device 112 or pointed at the display 114 is used with two polarizers. In one example of such an embodiment, the presentation device 112 may comprise a display (e.g., a screen) 114 onto which images may be projected and, optionally, an audio system 116 for generating signals representing audio. The frames of the first program 120 are projected through a horizontal polarizer onto the display 114 and the frames of the second program 122 are projected through a vertical polarizer onto the display 114 in the sequence described above.

In other embodiments, glasses 104a and 104b are configured to filter circularly polarized light instead. For example, glasses 104a may have a filter in both lenses 110a and 110b to filter out clockwise circularly polarized light and let through counter-clockwise circularly polarized light, and glasses 104b may have a filter in both lenses 108a and 108b configured to filter out counter-clockwise circularly polarized light and let through clockwise circularly polarized light. In such an embodiment, the frames of the first program 120 are projected through a counter-clockwise circular polarizer onto the display 114 and the frames of the second program 122 are projected through a clockwise circular polarizer onto the display 114 in the sequence described above. In any event, the filters of the glasses 104a and 104b are configured such that only light polarized in a way compatible with the respective lenses of the glasses 104a and 104b is allowed through the respective lenses. As a result of this, the first user wearing glasses 104a perceives only the set of images of the first program 120 while the second user wearing glasses 104b simultaneously perceives only the set of images of the second program 122.

In other embodiments, the display 114 of the presentation device 112 (e.g., a television screen) is coated with a polarization film such as a film pattern retarder to enable the user, when wearing glasses 104a or 104b, to view only every other line on the display 114 by using light polarized in a particular manner for those lines. Which lines the user can view thus depends on which of glasses 104a or 104b the user is wearing. For example, program 120 may be displayed using one set of lines of the display 114, while program 122 may be displayed using the other set of lines of the display 114. Thus, if a user is wearing glasses 104a, the user can see program 120 while watching the display 114, but not program 122. Simultaneously, another user may wear glasses 104b and will see program 122 on the display 114, but not program 120.

Another alternative embodiment uses active shutter glasses (e.g., active liquid crystal shutter glasses), but does not require using polarized light or lenses for filtering polarized light. For example, glasses 104a and 104b may be active liquid crystal shutter glasses. In this example embodiment, the active liquid crystal shutter glasses 104a and 104b use active liquid crystal technology to block both lenses 110a and 110b of glasses 104a while allowing light through both lenses 108a and 108b of glasses 104b. This is done in sequence with the presentation device 112 alternating the displaying of successive frames of program 120 with successive frames of program 122 each time the display 114 refreshes such that both lenses 110a and 110b of glasses 104a are blocked when the frames of program 122 are presented on the display 114 and both lenses 108a and 108b of glasses 104b are blocked when the frames of program 120 are presented on the display 114.

To do this, in this example embodiment, the glasses 104a and 104b, in addition to the liquid crystal lenses, contain circuitry and wireless receivers 106a and 106b, respectively, and connected batteries (not shown) that synchronize to the presentation device 112 via an infrared or other radio frequency (RF) signal from the presentation device 112. This signal may be any suitable wireless or other signal for communication between the presentation device 112 and the glasses 104a and 104b. For example, the signal may be, but is not limited to, an infrared signal, a radio frequency signal, a Digital Light Processing Link (DLP® Link) signal or a Bluetooth® signal, etc. Other embodiments include any other configuration or combination of configurations that allow synchronization between the glasses 104a and 104b and the presentation device 112, including using an emitter from the glasses 104a and 104b to the presentation device 112, a specific timing signal used by both the presentation device 112 and glasses 104a and 104b, etc. Thus, if a user is wearing glasses 104a, the user can see program 120 while watching the display 114, but not program 122. Simultaneously, another user may wear glasses 104b and will see program 122 on the display 114, but not program 120. Other technologies and systems for blocking out lenses of the glasses 104a and 104b in synchronization with the presentation device 112 may instead or also be used, such as mechanical shutter glasses and other types of active shutter glasses.

The presentation device transmits a first electrical signal 118a representing audio associated with the first program 120 while also transmitting a second electrical signal 118b representing audio associated with the second program. Two sets of headphones 124a and 124b are configured to receive the first electrical signal 118a and second electrical signal 118b, respectively. In this way, a user wearing glasses 104a and headphones 124a may both see and hear program 120 without seeing or hearing program 122. Also, a user wearing glasses 104b and headphones 124b may both see and hear program 122 without seeing or hearing program 120. In some alternative embodiments, the headphones 124a may be integrated with glasses 104a and the headphones 124b may be integrated with glasses 104b.

There may also be a user interface provided by the presentation device 112 with which a user may interact to select which glasses 104a and 104b and which headphones 124a and 124b are to be associated with which program 120 and 122. As a result of this selection, the headphones may be accordingly automatically configured to receive the associated audio of the selected program and the presentation device may display or project the selected program accordingly. This automatic configuration may be via a signal sent from the presentation device to the glasses 104a and 104b, headphones 124a and 124b and/or other external device such as a projector.

An electronic program guide (EPG) is generated by the presentation device 112 and may in some embodiments be integrated with the user interface to select which glasses 104a and 104b and which headphones 124a and 124b are to be associated with which program 120 and 122. The EPG may be activated by a remote control device (not shown) or other input device coupled to or integrated with the presentation device by either user of the display 114. Once activated, the EPG may be displayed normally such that it is visible through both glasses 104a and 104b, or alternatively, be visible through only one of glasses 104a and 104b, while the other program continues to be visible through the pair of glasses through which the EPG is not visible. For example, there may be two remote control devices, each one associated with a different one of program 120 or program 122, or one remote control device with different selectable controls designated as associated with either program 120 or program 122 or with either glasses 104a or 104b. When a user selects an EPG associated with one program currently being displayed or with glasses the user is currently using, the EPG is displayed in the same manner as the program associated with the EPG selected or glasses being used or otherwise chosen by the user (e.g., displayed using polarized light that is polarized differently than used to display the other program currently being displayed) such that the user is enabled to view the EPG and change channels or select different programming while the other user is able to continue to watch the other program or independently activate and view a different EPG associated with the other program.

Figure 2:
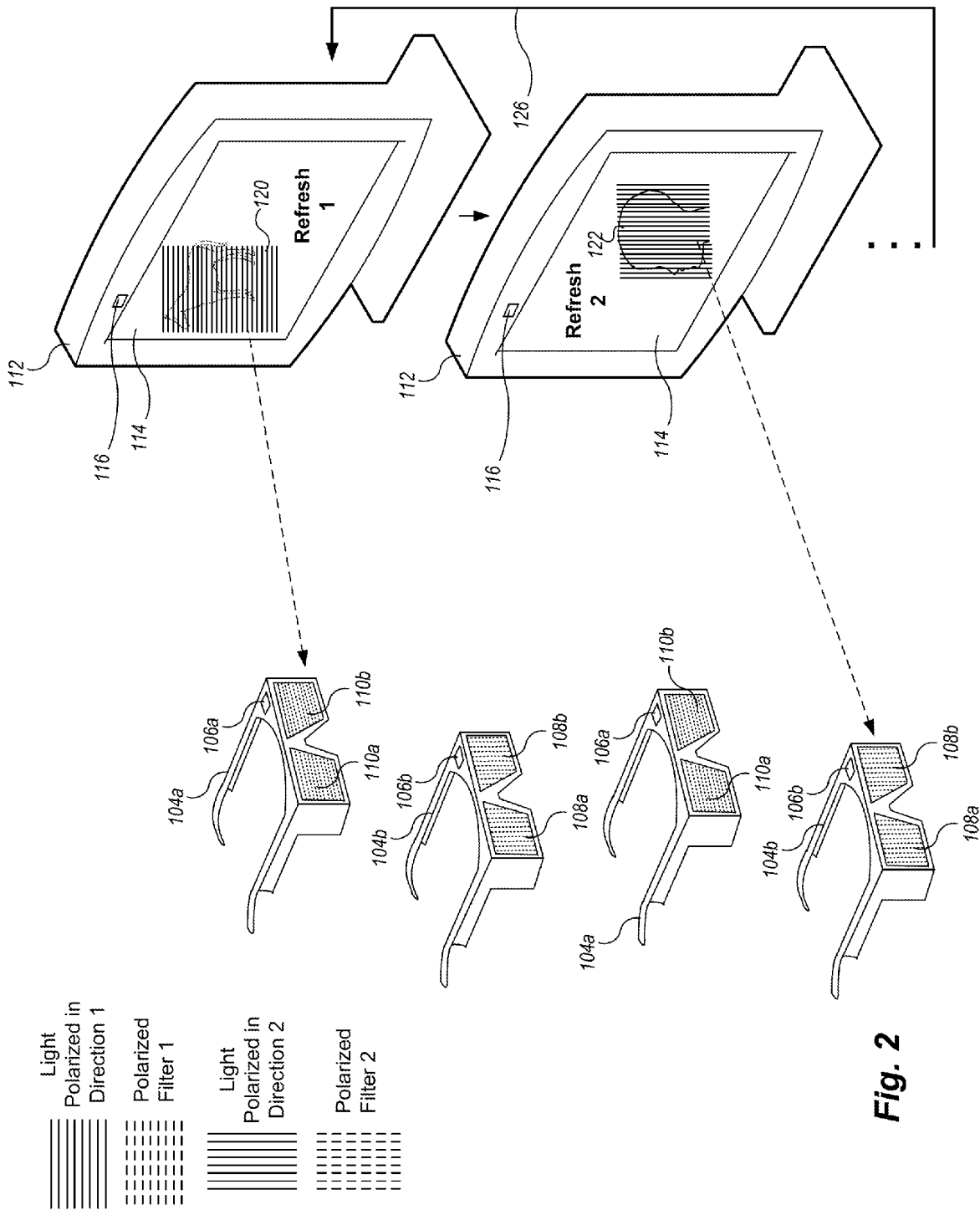
FIG. 2 is a diagram of a system for a dual-program display showing two instances of a screen refresh of the display, according to one non-limiting illustrated embodiment.

FIG. 2 is a diagram of a system for a dual-program display showing two instances of a screen refresh of the display, according to one non-limiting illustrated embodiment. Example images are shown being displayed for sequential refreshes (Refresh 1, Refresh 2) of the display 114. The refresh rate (also referred to as the "vertical refresh rate" or "vertical scan rate" for cathode ray tube devices) is the number of times in a second that display hardware draws the image data. This is distinct from the measure of frame rate of video in that the refresh rate may include the repeated drawing of identical frames, while frame rate measures how often a video source can feed an entire frame of new data to a display.

As shown, at Refresh 1 on display 114 a frame of program 120 is displayed using light polarized in a first direction. For example, this may be a frame projected onto the display 114, or generated on the display 114 using various display technologies of the presentation device 112 including, but not limited to, interlaced and non-interlaced systems, phase alternate line (PAL), National Television System Committee (NTSC) systems, progressive scan systems, plasma systems, liquid crystal display (LCD) systems, cathode ray tube (CRT) systems and various High Definition (HD) systems, etc., in conjunction with a polarization film such as a film pattern retarder on the display 114.

At Refresh 1, a user wearing glasses 104a is able to see the frame of program 120, but a user wearing glasses 104b is not able to see the frame of program 120 because both the lenses 108a and 108b filter out the light of the frame of program 1. At Refresh 2 on display 114 a frame of program 122 is displayed using light polarized in a second direction different than the direction of the polarization of light that was used to display the frame of program 120 at Refresh 1. At Refresh 2, a user wearing glasses 104b is able to see the frame of program 122, but a user wearing glasses 104a is not able to see the frame of program 122 because both the lenses 110a and 110b filter out the light of the frame of program 122.

The process then repeats 126 displaying successive frames in an alternating manner of program 120 and program 122 with each refresh of the display 114. Thus, if a user is wearing glasses 104a, the user can see program 120 while watching the display 114, but not program 122. Simultaneously, another user may wear glasses 104b and will see program 122 on the display 114, but not program 120.

Figure 3:
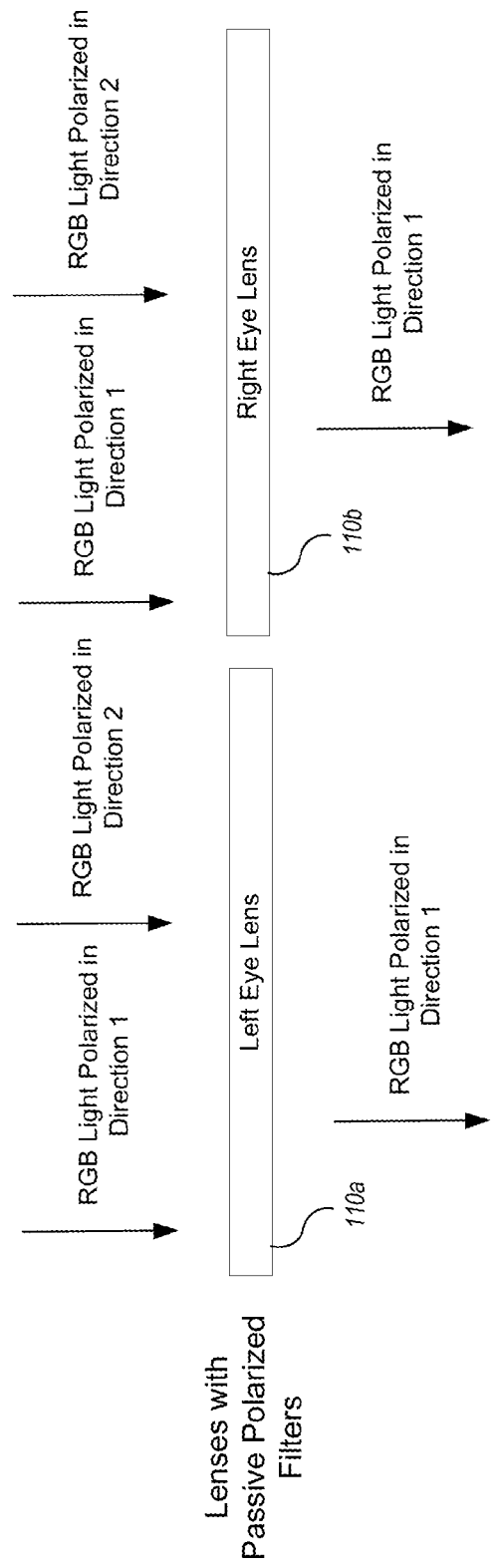
FIG. 3 is a top cross-sectional view of lenses of a first pair of glasses of the system for a dual-program display shown in FIG. 1 and FIG. 2, according to one non-limiting illustrated embodiment.

FIG. 3 is a top cross-sectional view of lenses 110a and 110b of glasses 104a of the system for a dual-program display shown in FIG. 1 and FIG. 2, according to one non-limiting illustrated embodiment. FIG. 3 shows that red-green-blue (RGB) light from the display 114 (shown in FIG. 1 and FIG. 2) enters the lenses 110a and 110b, and passive filters of the lenses 110a and 110b allow light from program 120 through the lens that is polarized in a first direction (Direction 1) while filtering out or blocking light from program 122 that is polarized in a second direction (Direction 2).

Figure 4:
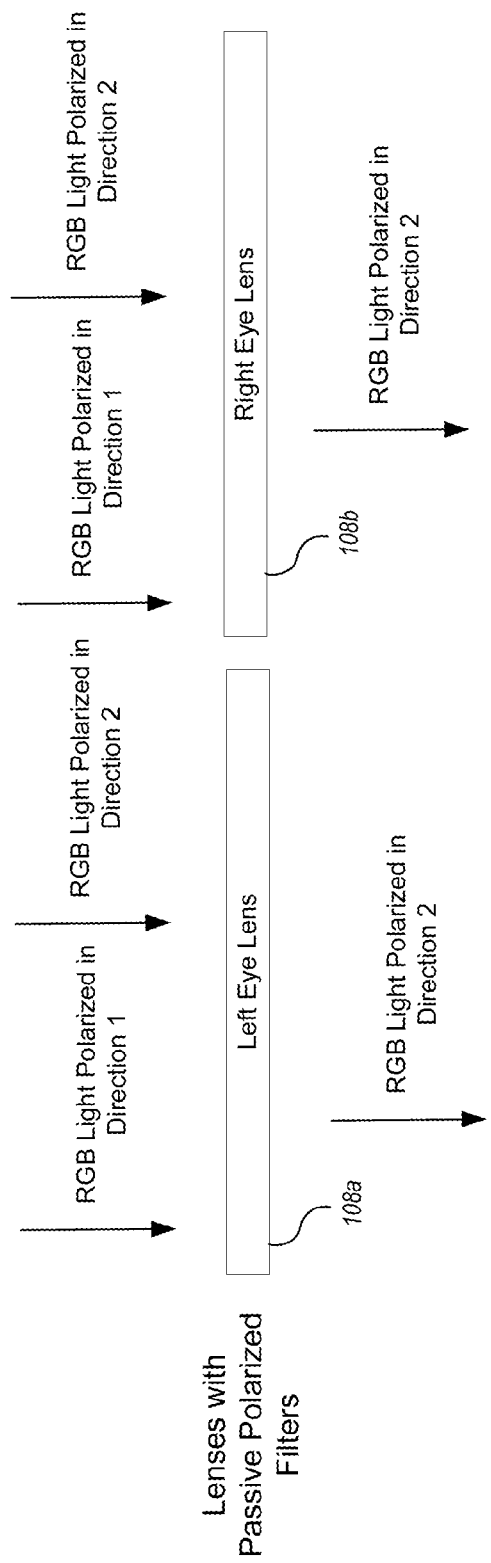
FIG. 4 is a top cross-sectional view of lenses of a second pair of glasses of the system for a dual-program display shown in FIG. 1 and FIG. 2, according to one non-limiting illustrated embodiment.

FIG. 4 is a top cross-sectional view of lenses 108a and 108b of glasses 104b of the system for a dual-program display shown in FIG. 1 and FIG. 2, according to one non-limiting illustrated embodiment. FIG. 4 shows that red-green-blue (RGB) light from the display 114 (shown in FIG. 1 and FIG. 2) enters the lenses 108a and 108b, and passive filters of the lenses 108a and 108b allow light from program 122 through the lens that is polarized in the second direction (Direction 2) while filtering out or blocking light from program 120 that is polarized in the first direction (Direction 1). Thus, if a user is wearing glasses 104a, the user can see program 120 while watching the display 114, but not program 122. Simultaneously, another user may wear glasses 104b and will see program 122 on the display 114, but not program 120.

Figure 5:
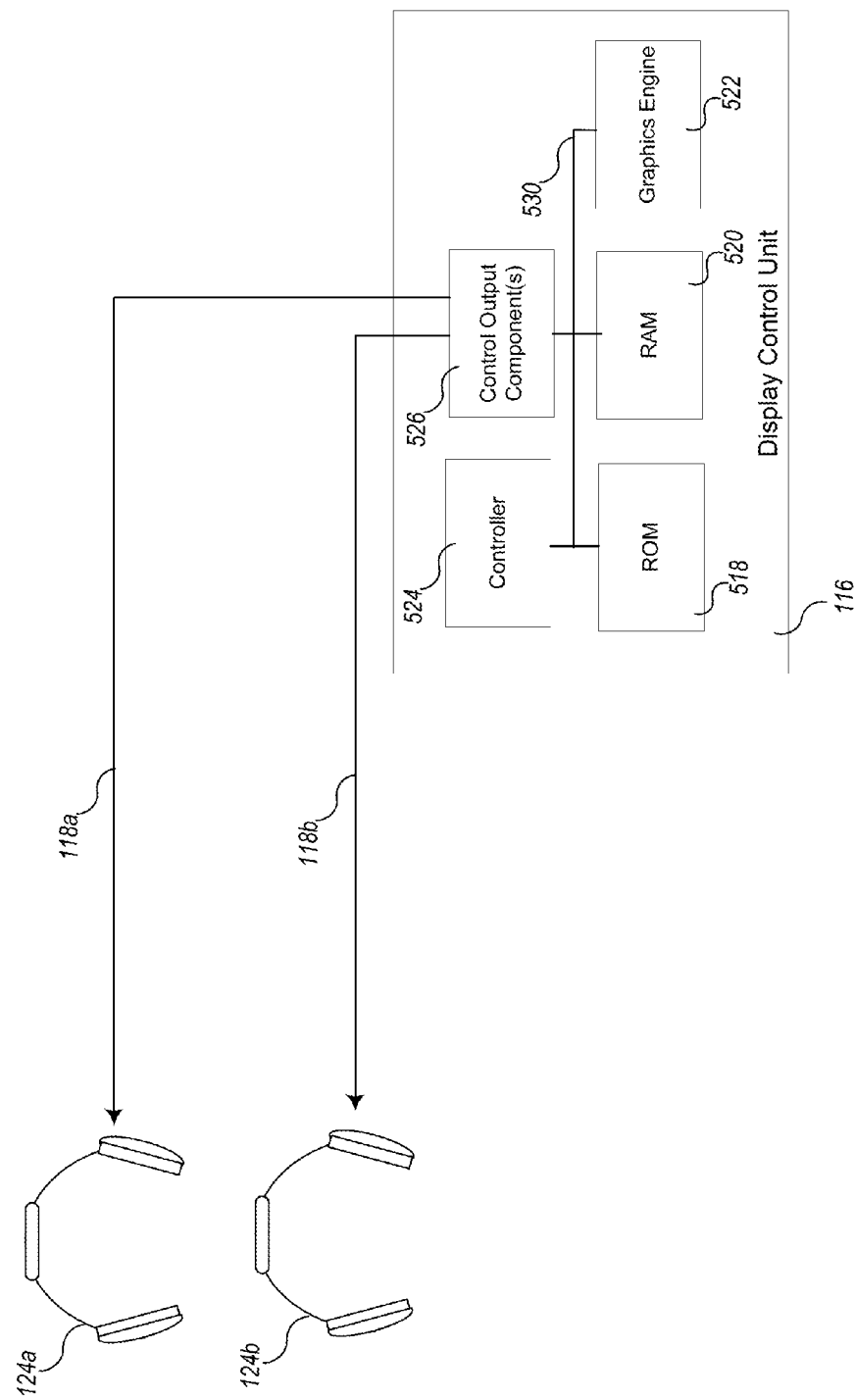
FIG. 5 is a schematic view of an example display control unit of the system for a dual-program display shown in FIG. 1 and FIG. 2, according to one non-limiting illustrated embodiment.

FIG. 5 is a schematic view of an example display control unit 116 of the system for a dual-program display shown in FIG. 1 and FIG. 2, according to one non-limiting illustrated embodiment. The controller 524 of the display control unit 116 may be a microprocessor, microcontroller, programmable logic controller (PLC), programmable gate array (PGA), application specific integrated circuit (ASIC) or another controller capable of sending signals to various outputs (including the control output components 526), performing logical operations, and sending signals to various other components. Typically, the controller 524 may take the form of a microprocessor (e.g., INTEL, AMD, ATOM). As shown, the display control unit 116 may also include one or more non-transitory processor- or computer-readable storage media, for example read only ROM 518 and RAM 520. The non-transitory processor- or computer-readable storage media 518 and 520 may be in addition to any non-transitory storage medium (e.g., registers) which is part of the controller 524. As shown, the display control unit 116 may also include one or more buses 530 (only one illustrated) coupling various components together, for example one or more power buses, instruction buses, data buses, etc.

Figure 6:
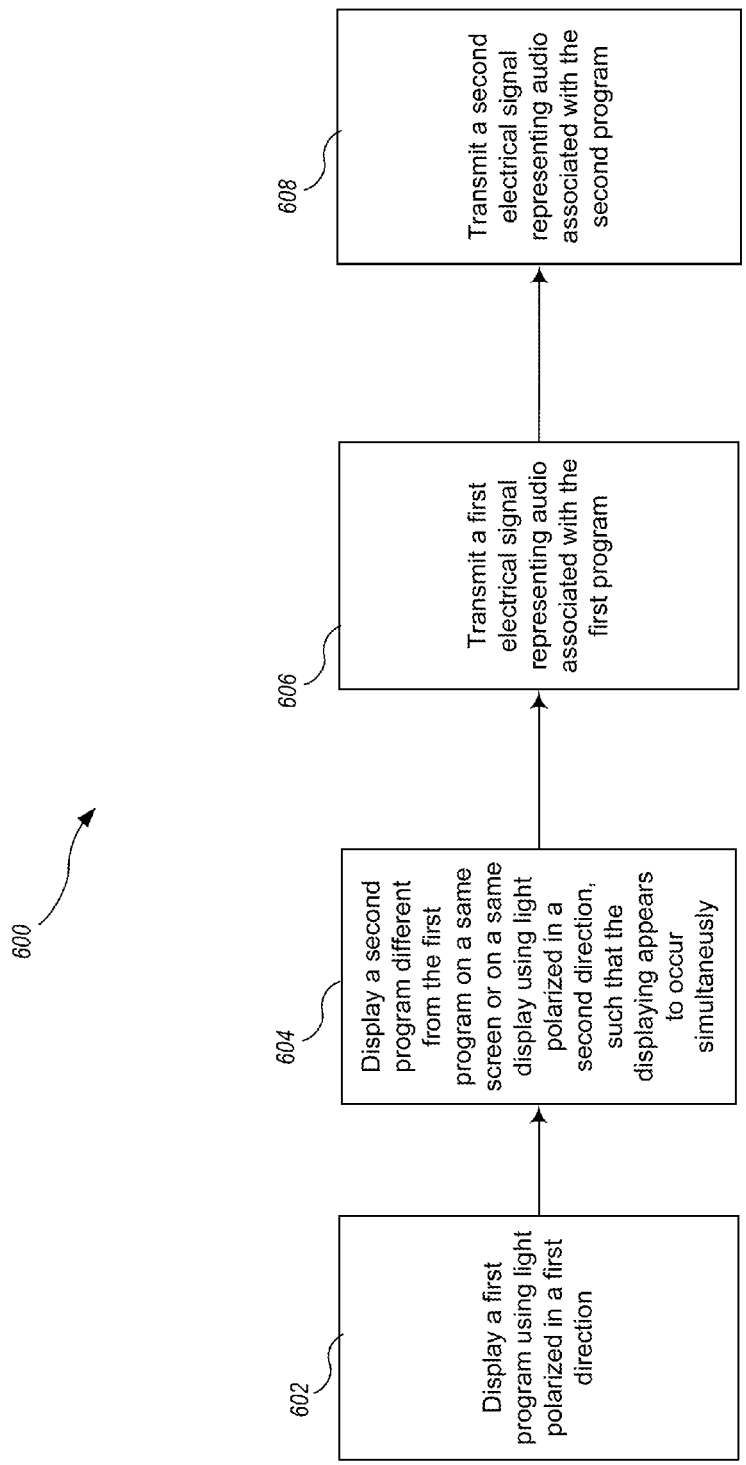
FIG. 6 is a flow diagram showing a method of operating the system for a dual-program display shown in FIG. 1 and FIG. 2, according to one non-limiting illustrated embodiment.
Figure 7:
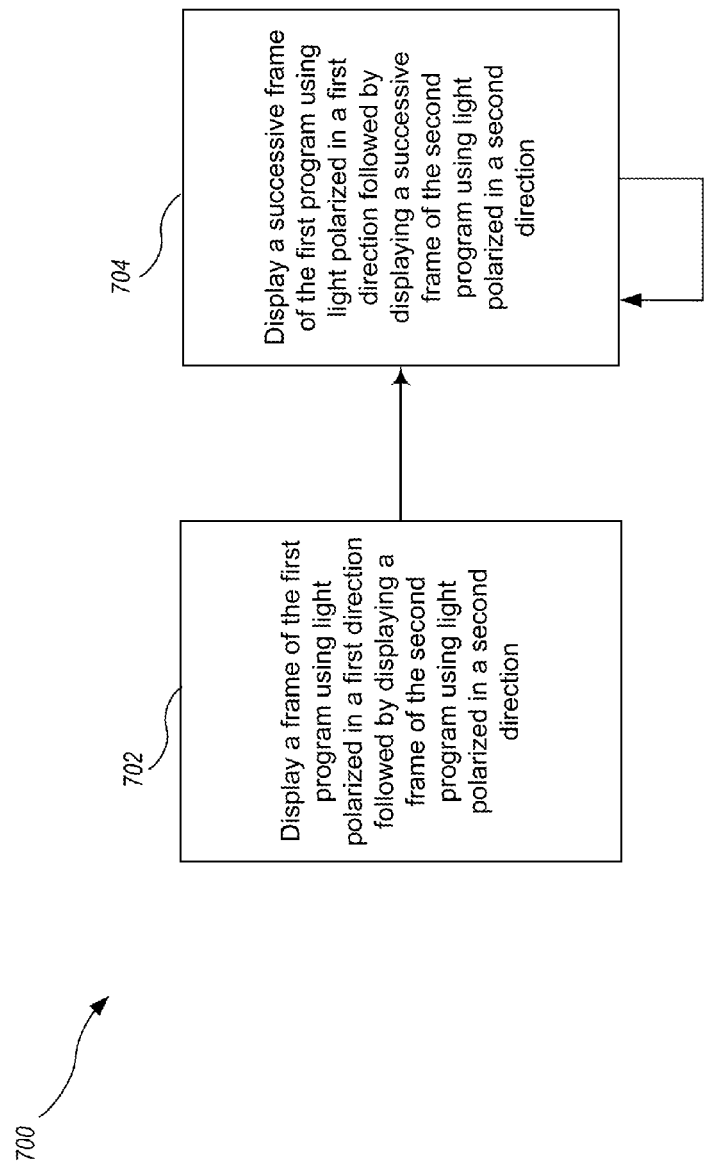
FIG. 7 is a flow diagram showing a method that may be included as part of the displaying step of the method shown in FIG. 1 and FIG. 2, according to one non-limiting illustrated embodiment.

As illustrated, the ROM 518 and RAM 520 store instructions and/or data or values for variables or parameters. The sets of data may take a variety of forms, for example a lookup table, a set of records in a database, etc. The instructions and sets of data or values are executable by the controller 524. Execution of such causes the controller 524 to perform specific acts to cause the generating and transmitting of a first electrical signal representing audio associated with the first program and transmitting of a second electrical signal representing audio associated with the second program. In some embodiments, the first electrical signal and second electrical signal are encoded individually into one signal. Also, one or both of the first electrical signal and the second electrical signal may be a wireless signal. Execution of instructions by the controller 524 also causes the controller 524 to perform specific acts to cause the presentation device 112 to display or a projector to project alternating successive frames of program 120 and program 122 each time the display refreshes and in synchronization with the display refreshes. Specific operation of the displaying or projecting alternating successive frames of program 120 and program 122 is described above and further below with reference to various flow diagrams (FIG. 6 and FIG. 7).

The controller 524 may use RAM 520 in a conventional fashion, for volatile storage of instructions, data, etc. The controller 524 may store data corresponding to the particular configurations of the filter or filters used by the active glasses 104a and 104b and may also store configuration data related to the display 114, the codec of the graphics engine 522, the refresh rate of the display 114, the format of the video being displayed, configuration data of an external projector, active glasses control units 106a and 106b, audio data or signals associated with program 120 and 122, etc. The graphics engine 522 includes graphics circuitry and/or instructions stored on a computer readable medium to encode/decode or otherwise generate digital video for display on the display 114 in the manners described herein. For example, the graphics engine 522 generates the video of programs 120 and 122 and also the electronic program guide (EPG) for display on the display 114 and works in conjunction with the controller for displaying of the frames of video for programs 120 and 122 in synchronization with the refresh of the display 114 as described above. The graphics engine 522 may include a number of sub-components responsible for generating particular elements of the video for display such as an EPG associated with program 120 or 122 and glasses 104a and 104b.

The instructions are executable by the controller 524 to control displaying a frame of the first program followed by displaying a frame of the second program, displaying a successive frame of the first program followed by displaying a successive frame of the second program, and repeating the displaying the successive frames to display the first program and to display the second program on the same display 114.

The control output components 526 are configured to the control the transmitting of the first electrical signal representing audio associated with the program 120 and transmitting of a second electrical signal representing audio associated with the program 122 at any given time and, in some embodiments, to also send control signals to be received by wireless receivers 106a and 106b, of glasses 104a and 104b, respectively, shown in FIG. 1 and FIG. 2 to synchronize them with the presentation device 112 in the manner discussed above. For example the output components 526 may be those configured to send signals including, but not limited to, one or more of: infrared signals, radio frequency (RF) signals, (Digital Light Processing) Link (DLP® Link) signals and Bluetooth® signals.

FIG. 6 is a flow diagram showing a method 600 of operating the system for a dual-program display shown in FIG. 1 and FIG. 2, according to one non-limiting illustrated embodiment. For example, the methods described below may be those which are executed by the display control unit 116 shown in FIG. 5.

At 602, the presentation device 112 displays at least a portion of a first program using light polarized in a first direction.

At 604, the presentation device 112 displays at least a portion of a second program different from the first program on the same display using light polarized in a second direction, such that the displaying appears to occur simultaneously.

At 606, the presentation device 112 transmits a first electrical signal representing audio associated with the first program.

At 608, the presentation device 112 transmits a second electrical signal representing audio associated with the second program. This displaying of the first and second program (e.g., program 120 and 122) is such that at least the portion of the first program is enabled to be viewed by a first user from the same display without the first user seeing the second program by use of a first pair of polarized glasses by the first user. This occurs while at least the portion of the second program is enabled to be simultaneously viewed by a second user from the same display without the second viewer seeing the first program by use of a second pair of polarized glasses by the second user that are polarized differently than the first pair of polarized glasses.

The displaying of the first program and the displaying of the second program may, in some embodiments, include combining two separate video signals into one video signal for display of the first program and the second program simultaneously and independently of each other on the same display. For example, this may be accomplished by using alternating lines of the display for the first program and the second program and may be executed by the graphics engine 522 of the display control unit 116 shown in FIG. 5. The graphics engine 522 may perform this by encoding pairs of digital video frames into one frame for each pair. A first video frame of each of the pairs represented by the first of the two separate video signals and a second video frame of each of the pairs of video frames is represented by the second of the two separate video signals.

FIG. 7 is a flow diagram showing a method 700 that may be included in step 604 of method 600 shown in FIG. 1 and FIG. 2, according to one non-limiting illustrated embodiment.

At 702, the presentation device 112 displays a frame of the first program using light polarized in a first direction followed by displaying a frame of the second program using light polarized in a second direction.

At 704, the presentation device 112 displays a successive frame of the first program using light polarized in a first direction followed by displaying a successive frame of the second program using light polarized in a second direction. Thus, referring again to FIG. 1 and FIG. 2, if a user is wearing glasses 104a, the user can see program 120 while watching the display 114, but not program 122. Simultaneously, another user may wear glasses 104b and will see program 122 on the display 114, but not program 120.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method of displaying dual programs on a same display, the method comprising:
    displaying on the display during a first time interval, a frame of a first program using light polarized in a first polarization direction;
    displaying on the display during a second time interval, a frame of a second program, different from the first program, using light polarized in a second polarization direction, such that the displaying the frame of the first program and the displaying the frame of the second program appears to an unaided human eye to occur simultaneously and independently on the same display;
    continuing to display successive frames of the first and second programs in a time-alternating manner on the same display, such that the first program is enabled to be viewed by a first user, without the first user seeing the second program, through a first pair of polarized glasses, while the second program is enable to be simultaneously viewed by a second user from the same display, without the second viewer seeing the first program, through a second pair of polarized glasses that are polarized differently than the first pair of polarized glasses;
    transmitting a first electrical signal representing audio associated with the first program; and
    transmitting a second electrical signal representing audio associated with the second program.

2. The method of claim 1 wherein at least one of the first electrical signal and the second electrical signal is a wireless signal.

3. The method of claim 1 wherein the first and second time intervals correspond to first and second screen refresh rates.

4. The method of claim 1 wherein each frame is a frame of a film.

5. The method of claim 1 wherein each frame is a frame of a digital video stream.

6. The method of claim 1 wherein a first of two separate video signals represents the first program and a second of two separate video signals represents the second program, and the combining the two separate video signals includes encoding pairs of digital video frames into one frame for each pair, a first video frame of each of the pairs represented by the first of the two separate video signals and a second video frame of each of the pairs of video frames represented by the second of the two separate video signals.

7. The method of claim 1 wherein the first polarization direction is a first circular direction and the second polarization direction is second circular direction, opposite the first circular direction.

8. The method of claim 1 wherein the first program and second program are video programs.

9. The method of claim 1 wherein the same display is a movie screen.

10. The method of claim 1 wherein the displaying at least the portion of the first program and the displaying at least the portion of the second program is on the same display and wherein the same display is a digital video display.

11. The method of claim 1 wherein each frame is a frame of a television broadcast.

12. The method of claim 1 wherein the first polarization direction is linear, and the second direction is linear and orthogonal to the first polarization direction.

13. A system for displaying dual programs on a same display at the same time comprising:
    a memory; and
    at least one processor coupled to the memory, wherein the at least one processor is configured to:
        display on the display a first program using light polarized in a first polarization direction; and
        display a second program different from the first program on the same display on which the first program is displayed using light polarized in a second polarization direction, such that the displaying the first program and the displaying the second program would at least appear to occur, by an unaided human eye, simultaneously and independently on the same display, wherein the displaying the first program and the displaying the second program includes:
- displaying a frame of the first program followed by displaying a frame of the second program;
- displaying a successive frame of the first program followed by displaying a successive frame of the second program; and
- continuing to display successive frames of the first program and the second program in a time-alternating manner on the same display, such that the first program is enabled to be viewed by a first user, without the first user seeing the second program, through a first pair of polarized glasses, while the second program is enable to be simultaneously viewed by a second user from the same display, without the second viewer seeing the first program, through a second pair of polarized glasses that are polarized differently than the first pair of polarized glasses.

14. The system of claim 13 wherein the at least one processor is further configured to:
- transmit a first electrical signal representing audio associated with the first program; and
- transmit a second electrical signal representing audio associated with the second program.

15. The system of claim 13, further comprising the first pair of polarized glasses and the second pair of polarized glasses.

16. The system of claim 15, further comprising:
- a first pair of headphones configured to selectively wirelessly receive the first electrical signal representing audio associated with the first program or the second electrical signal representing audio associated with the first program; and
- a second pair of headphones configured to selectively wirelessly receive the first electrical signal representing audio associated with the first program or the second electrical signal representing audio associated with the first program.

17. The system of claim 16 wherein the first pair of headphones is configured to wirelessly communicate with the first pair of glasses and receive a control signal from the first pair of glasses to select to receive the first electrical signal representing audio associated with the first program.

18. The system of claim 15 wherein the first pair of polarized glasses has integrated headphones configured to wirelessly receive the first electrical signal representing audio associated with the first program and wherein the second pair of polarized glasses has integrated headphones configured to wirelessly receive the second electrical signal representing audio associated with the second program.

19. The system of claim 15, further comprising the same display coupled to the at least one processor.

20. A non-transitory computer-readable storage medium having computer executable instructions thereon, that when executed by a computer processor, cause the following method to be performed:
- displaying on a display during a first time interval, a frame of a first program using light polarized in a first polarization direction;
- displaying on the display during a second time interval, a frame of a second different program using light polarized in a second polarization direction, such that the first program is enabled to be viewed by a first user, without the first user seeing the second program, through a first pair of polarized glasses, while the second program is enable to be simultaneously viewed by a second user from the same display, without the second viewer seeing the first program, through a second pair of polarized glasses that are polarized differently than the first pair of polarized glasses, such that the displaying the frame of the first program and the displaying the frame of the second program appears to an unaided human eye to occur simultaneously and independently on the same display, wherein the displaying at least the portion of the first program and the displaying at least the portion of the second program includes:
  - displaying a frame of the first program followed by displaying a frame of the second program;
  - displaying a successive frame of the first program followed by displaying a successive frame of the second program; and
  - continuing to display successive frames of the first program and the second program in a time-alternating manner on the same display.

21. The non-transitory computer-readable storage medium of claim 20 wherein the computer executable instructions stored thereon, when executed by the computer processor, further cause the following to be performed:
- receiving a signal to change the first program to a third program;
- displaying, in response to the receiving the signal, at least a portion of the third program instead of at least the portion of the first program using light polarized in a first polarization direction; and
- continuing to display at least the portion of the second different program using light polarized in a second polarization direction on the display.

* * * * *